US007791872B2

(12) United States Patent
Wu et al.

(10) Patent No.: US 7,791,872 B2
(45) Date of Patent: Sep. 7, 2010

(54) FIXING MECHANISM FOR FIXING ELECTRONIC DEVICES AND HOLDING MODULE THEREOF

(75) Inventors: Kai-Kuei Wu, Taipei County (TW); Hsiao-Liang Chen, Taipei Hsien (TW)

(73) Assignee: Micro-Star Int'l Co., Ltd., Jung-He, Taipei Hsien (TW)

( * ) Notice: Subject to any disclaimer, the term of this patent is extended or adjusted under 35 U.S.C. 154(b) by 136 days.

(21) Appl. No.: 12/350,964

(22) Filed: Jan. 9, 2009

(65) Prior Publication Data

US 2010/0128430 A1 May 27, 2010

(30) Foreign Application Priority Data

Nov. 25, 2008 (TW) ............................... 97221074 U (51) Int. Cl.
*G06F 1/16* (2006.01)

(52) U.S. Cl. .................. 361/679.33; 174/260; 455/572; 360/256.3

(58) Field of Classification Search .................. 174/50, 174/546, 260, 367, 152 GM; 455/575.7, 455/572; 360/97.01, 97.02, 256.3; 439/638; 345/582, 102; 165/121; 361/679.08, 679.09, 361/679.21, 679.27, 679.31, 679.32, 679.33, 361/679.47, 679.54, 679.55
See application file for complete search history.

(56) References Cited

U.S. PATENT DOCUMENTS

| 6,392,884 | B1 * | 5/2002 | Chou ..................... 361/679.33 |
| 7,173,815 | B2 * | 2/2007 | Lee ........................ 361/679.57 |
| 2006/0006521 | A1 * | 1/2006 | Boon et al. ................. 257/701 |

* cited by examiner

*Primary Examiner*—Hung V Duong
(74) *Attorney, Agent, or Firm*—Winston Hsu (57) ABSTRACT

A fixing mechanism includes a case and a flexible fixing lid. The case includes a lower board, a first lateral board, and a second lateral board. A first containing space is formed on the lower board for containing a first electronic device. The first lateral board has a protruding part for insertion into a first fixing hole of the first electronic device. A second containing space is formed by the flexible fixing lid and the case cooperatively for containing the second electronic device on the first electronic device. The flexible fixing lid includes a base board, a first fastening part, and a second fastening part. The first fastening part is connected to an end of the base board for fastening the first lateral board. The second fastening part is connected to an end of the base board opposite to the first fastening part for fastening the second lateral board.

18 Claims, 7 Drawing Sheets

FIXING MECHANISM FOR FIXING ELECTRONIC DEVICES AND HOLDING MODULE THEREOF

BACKGROUND OF THE INVENTION

1. Field of the Invention

The present invention relates to a fixing mechanism and a holding module thereof, and more specifically, to a fixing mechanism for fixing electronic devices and a holding module thereof.

2. Description of the Prior Art

In general, a computer, in which many electronic components (such as a CPU, a motherboard, a power supply, interface cards, and disk drives) are disposed, has powerful and various functions, like data storage, video display, optical disk recording, and so on. Thus, assembly and disposal of each component inside the computer is time-consuming and strenuous. For example, if a user wants to fix an optical disk drive to a computer case, the user usually needs to insert the optical disk drive into a corresponding disk drive slot of the computer case first. Subsequently, the user needs to align screw holes on a side of the optical disk drive with holes of the disk drive slot. After the user utilizes an auxiliary tool (such as a screwdriver) to drive screws to pass through the corresponding holes of the disk drive slot and lock the screws into the said screw holes respectively, the optical disk drive may be fixed to the computer case. However, if the optical disk drive malfunctions in the future, a subsequent disassembly process for detaching the optical disk drive from the computer case is also complicated. Furthermore, when the user wants to assemble a plurality of disk drives to a computer case, the related disassembly processes may be more time-consuming and strenuous than the said disassembly process for detaching the optical disk drive from the computer case. To sum up, the said complicated assembly and disassembly processes may make the screw-locking method in the prior art inconvenient in use. Therefore, how to assemble a disk drive to a computer case more easily and quickly should be a concern in computer structural design.

SUMMARY OF THE INVENTION

The present invention provides a fixing mechanism for fixing electronic devices, the fixing mechanism comprising a case comprising a lower board, a first containing space formed on the lower board for containing a first electronic device; a first lateral board connected to a side of the lower board and having a protruding part, the protruding part used for insertion into a first fixing hole of the first electronic device when the first electronic device is disposed on the lower board; and a second lateral board connected to a side of the lower board opposite to the first lateral board; and a flexible fixing lid disposed on the case, a second containing space formed by the flexible fixing lid and the case cooperatively for containing a second electronic device on the first electronic device, the flexible fixing lid comprising a base board; a first fastening part connected to an end of the base board for fastening the first lateral board; and a second fastening part connected to an end of the base board opposite to the first fastening part for fastening the second lateral board.

The present invention further provides a holding module for fixing electronic devices, the holding module comprising a frame having a positioning hole; a first electronic device having a first fixing hole and a second fixing hole; a second electronic device; and a fixing mechanism for fixing the first electronic device and the second electronic device to the frame, the fixing mechanism comprising a case comprising a lower board, a first containing space formed on the lower board for containing the first electronic device; a first lateral board connected to a side of the lower board and having a protruding part, the protruding part used for insertion into the first fixing hole of the first electronic device when the first electronic device is disposed on the lower board; and a second lateral board connected to a side of the lower board opposite to the first lateral board; and a flexible fixing lid disposed on the case, a second containing space formed by the flexible fixing lid and the case cooperatively for containing the second electronic device on the first electronic device, the flexible fixing lid comprising a base board; a first fastening part connected to an end of the base board for fastening the first lateral board; and a second fastening part connected to an end of the base board opposite to the first fastening part for fastening the second lateral board.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
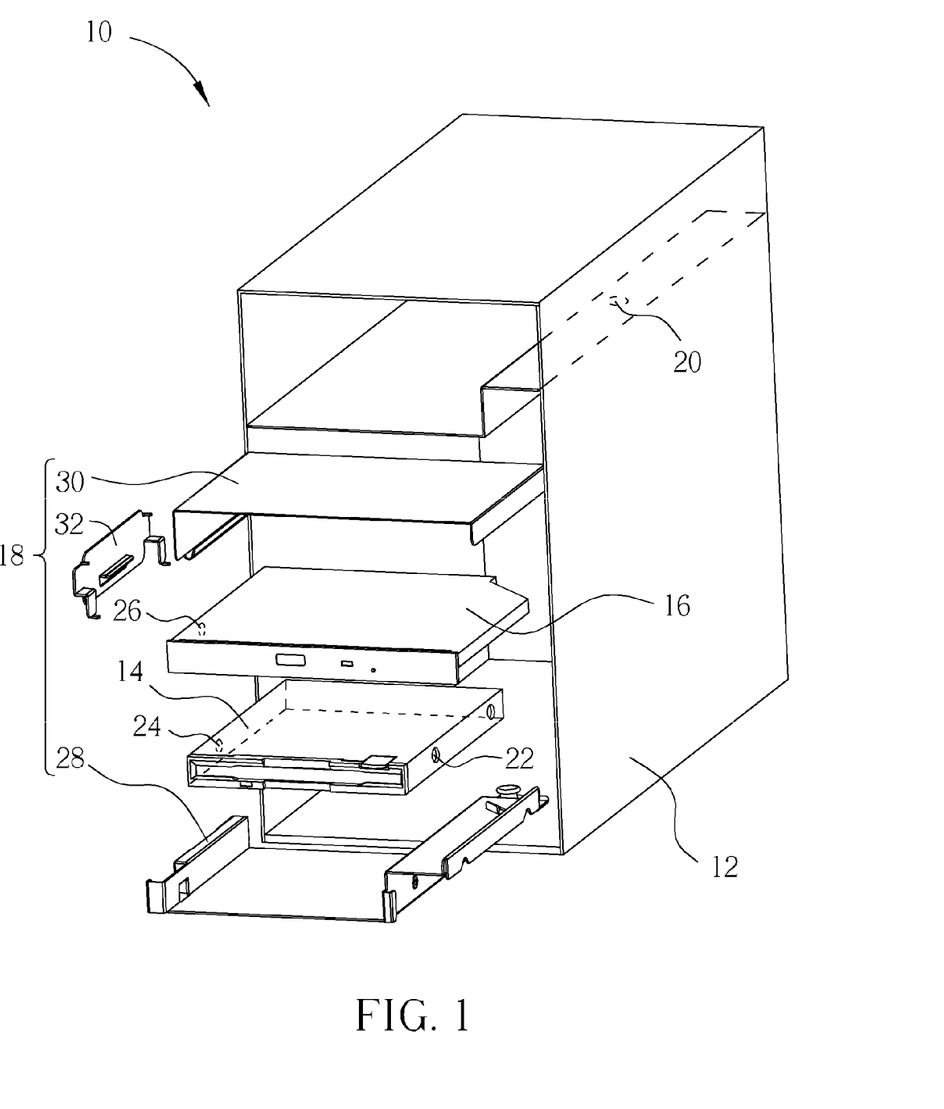
FIG. 1 is an exploded diagram of a holding module according to the present invention.
Figure 2:
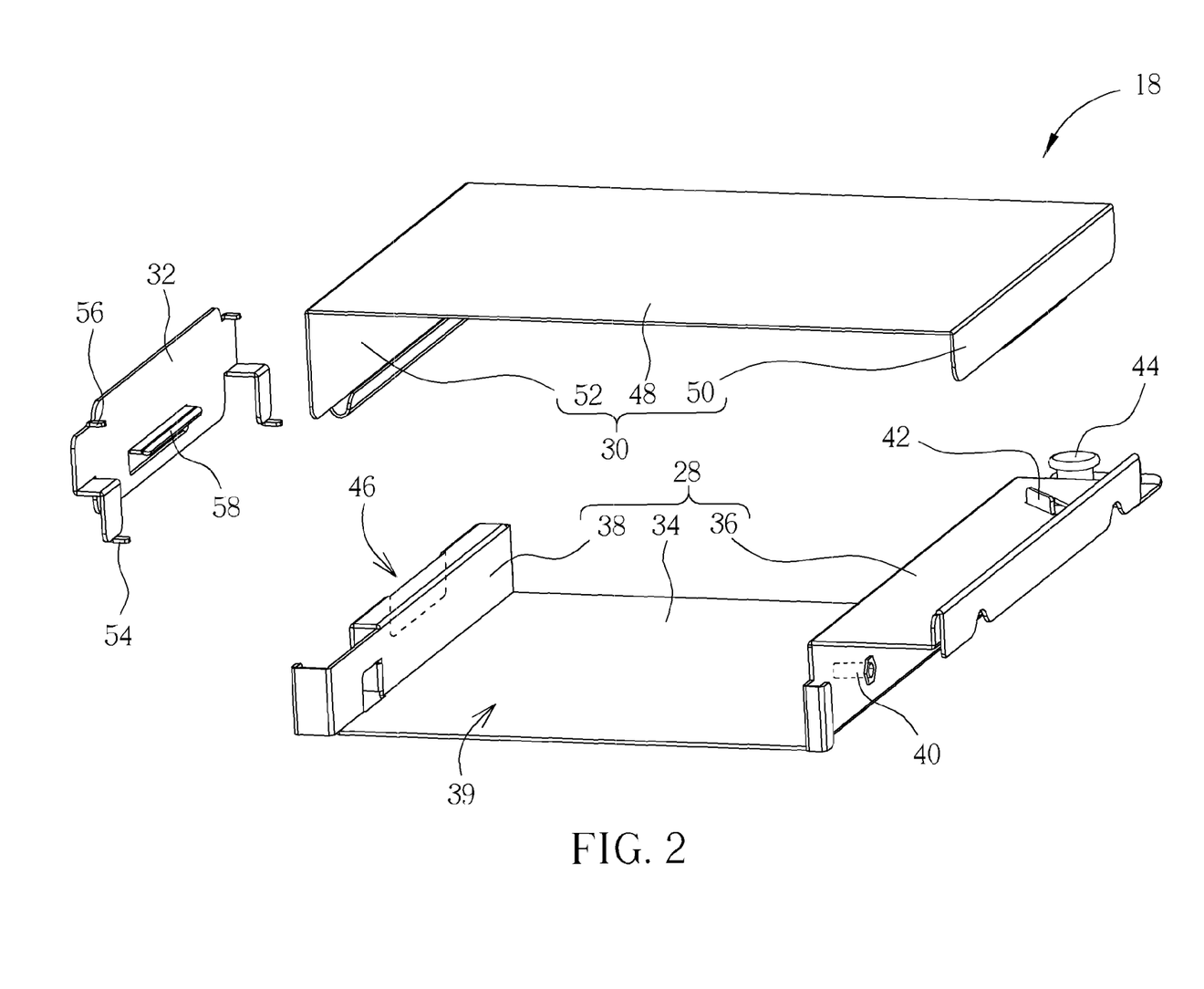
FIG. 2 is an enlarged diagram of the fixing mechanism in FIG. 1.

Please refer to FIG. 1, which is an exploded diagram of a holding module 10 according to the present invention. The holding module 10 comprises a frame 12, a first electronic device 14, a second electronic device 16, and a fixing mechanism 18. A positioning hole 20 is formed on the frame 12. A first fixing hole 22 and a second fixing hole 24 are formed on the first electronic device 14. A third fixing hole 26 is formed on the second electronic device 16. The first electronic device 14 may be a floppy disk drive, a card reader, or a common storage device. The second electronic device 16 may be a hard disk drive, an optical disk drive, or a common storage device. Next, please refer to FIG. 2, which is an enlarged diagram of the fixing mechanism 18 in FIG. 1. The fixing mechanism 18 is used for fixing the first electronic device 14 and the second electronic device 16 to the frame 12. The fixing mechanism 18 comprises a case 28, a flexible fixing lid 30, and a fixing plate 32. The case 28 comprises a lower board 34, a first lateral board 36, and a second lateral board 38. As FIG. 2 shows, a first containing space 39 is formed cooperatively by the lower board 34, the first lateral board 36, and the second lateral board 38. The first containing space 39 is used for containing the first electronic device 14. The first lateral board 36 is connected to a side of the lower board 34. The first lateral board 36 has a protruding part 40, a stopper 42, and a positioning rod 44. The protruding part 40 is used for insertion into the first fixing hole 22 of the first electronic device 14 when the first electronic device 14 is disposed on the lower board 34. The protruding part 40 may be a pin. The stopper 42 is used for positioning the second electronic device 16 on the case 28. The positioning rod 44 is used for insertion into the positioning hole 20 of the frame 12 so as to fix the fixing mechanism 18 to the frame 12. The second lateral board 38 is connected to a side of the lower board 34 opposite to the first lateral board 36. A guiding slot 46 is formed on second lateral board 38.

Figure 3:
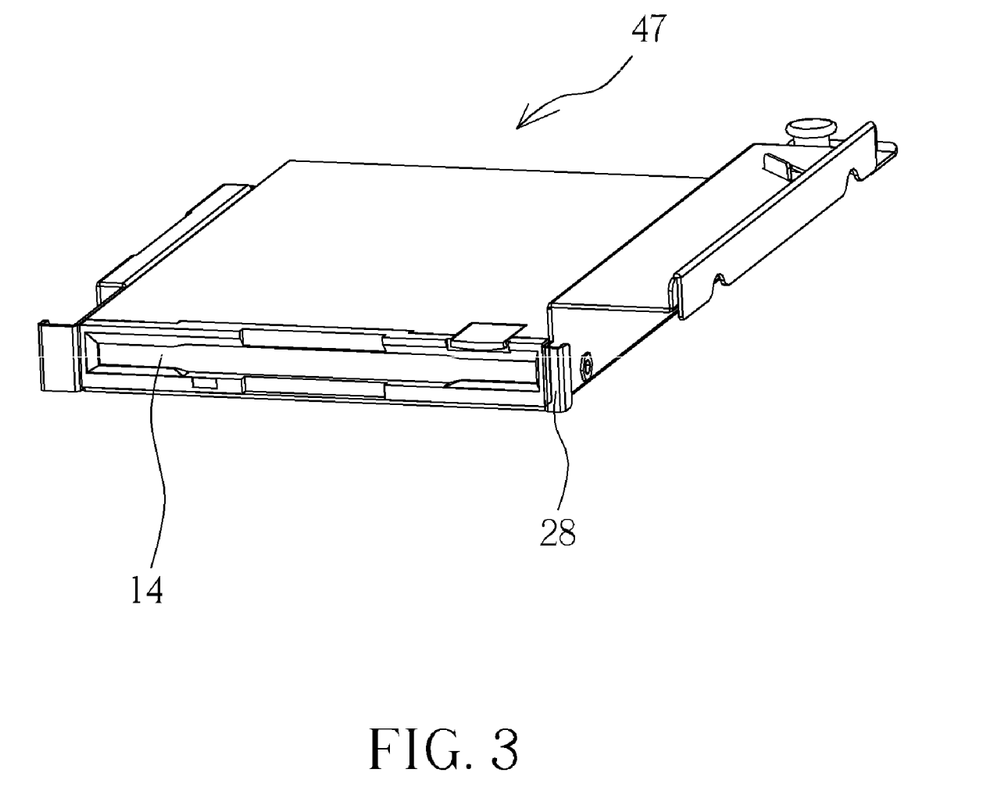
FIG. 3 is a diagram of disposing the first electronic device in FIG. 1 in the case of the fixing mechanism.

The said flexible fixing lid 30 is disposed on the case 28. A second containing space 47 is formed cooperatively by the flexible fixing lid 30 and the case 28. In other words, the space above the first electronic device 14 (as shown in FIG. 3) is used for containing and fixing the second electronic device 16 on the first electronic device 14. The flexible fixing lid 30 comprises a base board 48, a first fastening part 50, and a second fastening part 52. The first fastening part 50 is connected to a side of the base board 48. The first fastening part 50 is used for fastening the first lateral board 36. The second fastening part 52 is connected to an end of the base board 48 opposite to the first fastening part 50. The second fastening part 52 is used for fastening the second lateral board 38. The fixing plate 32 is disposed between the second fastening part 52 and the second lateral board 38. The fixing plate 32 has a first inserting part 54, a second inserting part 56, and a guiding part 58. The first inserting part 54 and the second inserting part 56 are used for respectively insertion into the second fixing hole 24 of the first electronic device 14 and the third fixing hole 26 of the second electronic device 16 when the second fastening part 52 fixes the fixing plate 32 to the second lateral board 38. As shown in FIG. 2, the first inserting part 54 and the second inserting part 56 may be a pin. The guiding part 58 is used for insertion into the guiding slot 46 of the second lateral board 38 so as to fix the fixing plate 32 to the second lateral board 38.

Figure 4:
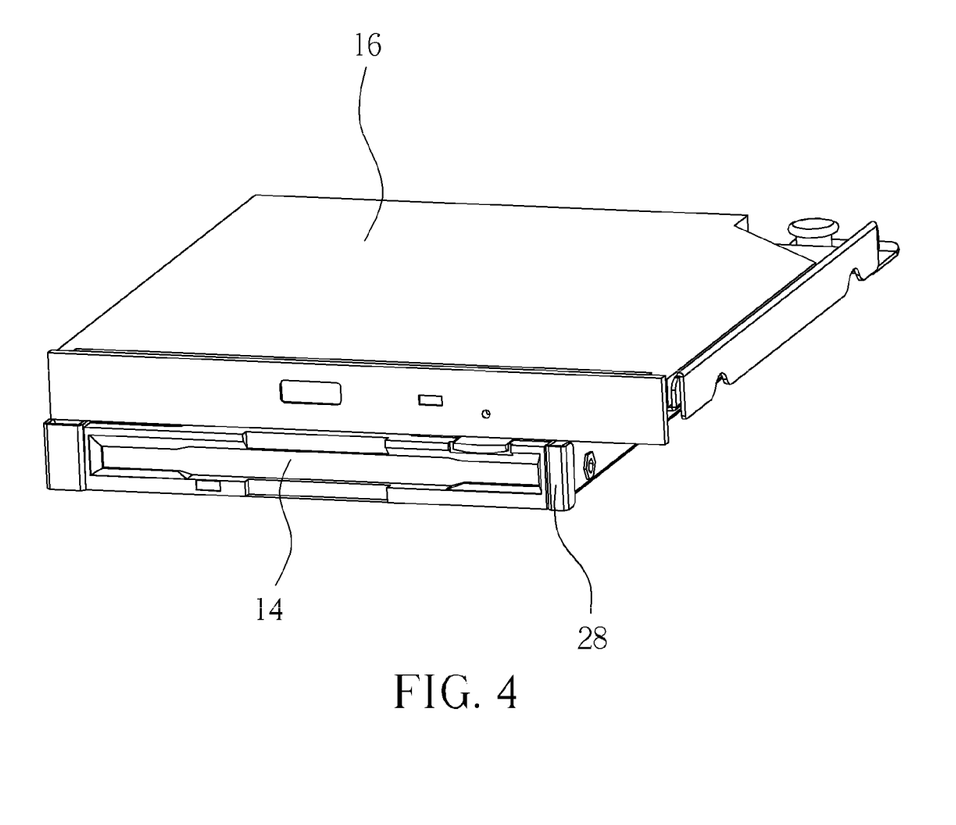
FIG. 4 is a diagram of disposing the first electronic device and the second electronic device in the case of the fixing mechanism.
Figure 5:
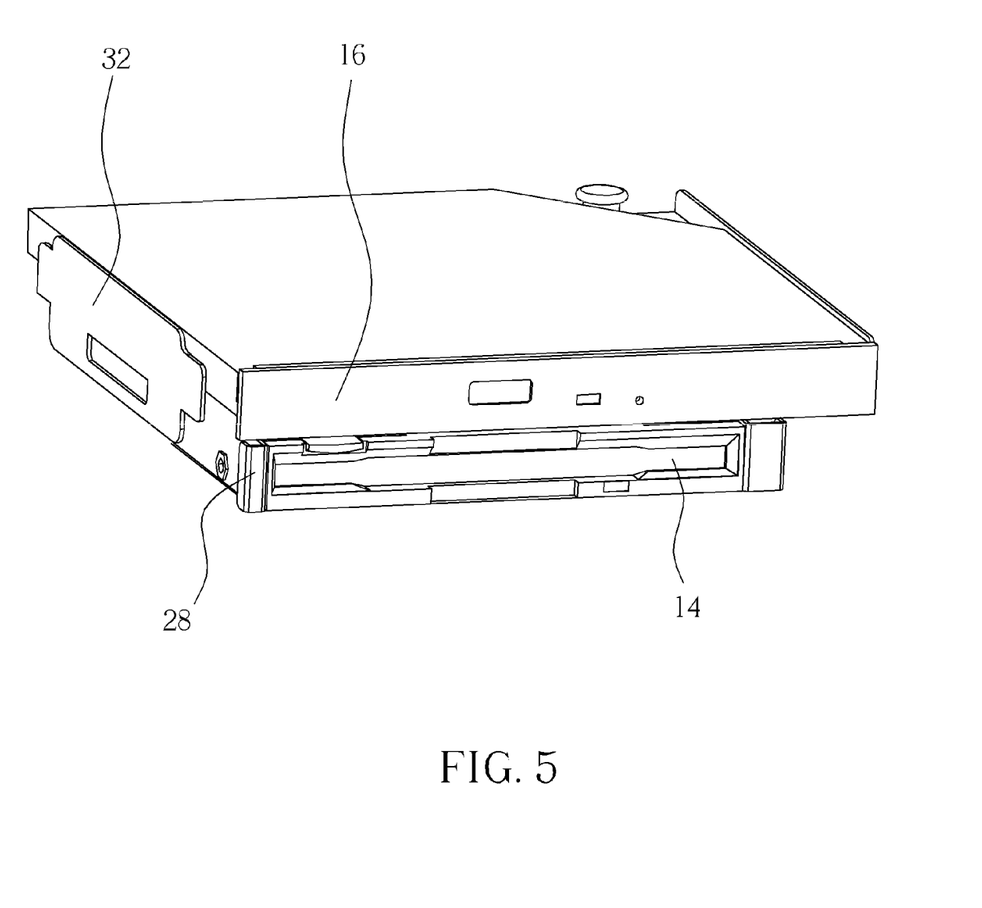
FIG. 5 is a diagram of the fixing plate fixing the first electronic device and the second electronic device to the case of the fixing mechanism.
Figure 6:
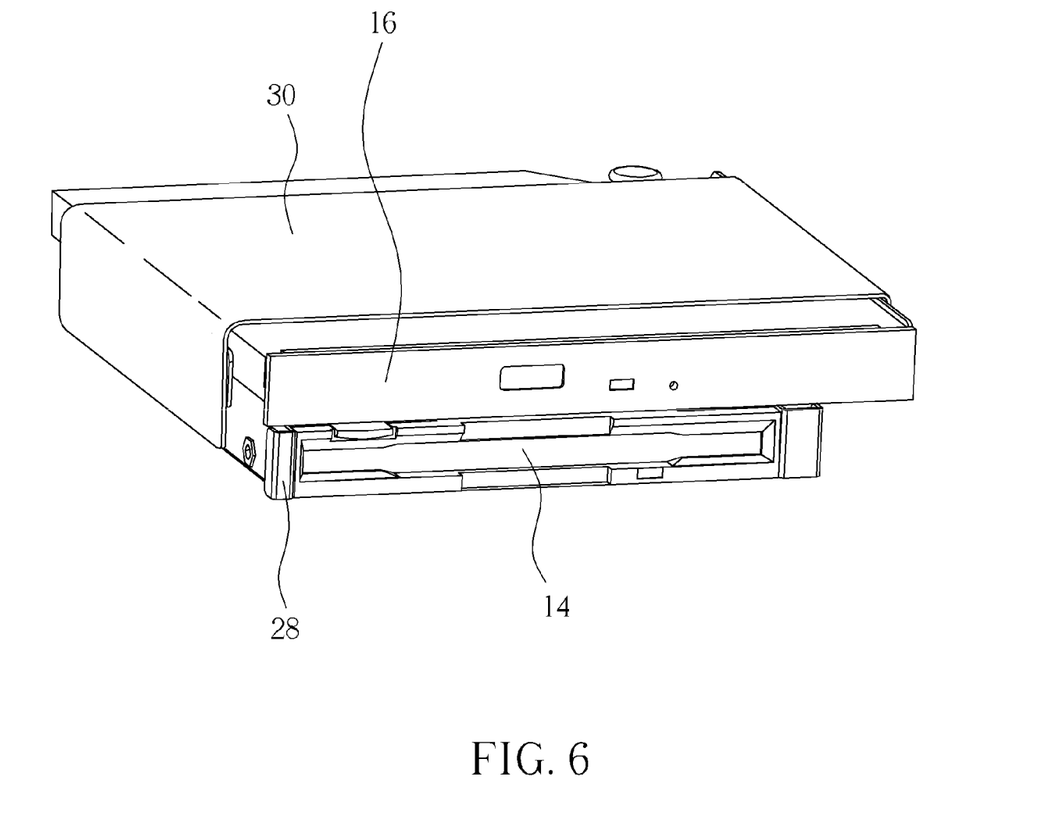
FIG. 6 is a diagram of the flexible fixing lid in FIG. 1 fixing the first electronic device and the second electronic device to the case of the fixing mechanism.
Figure 7:
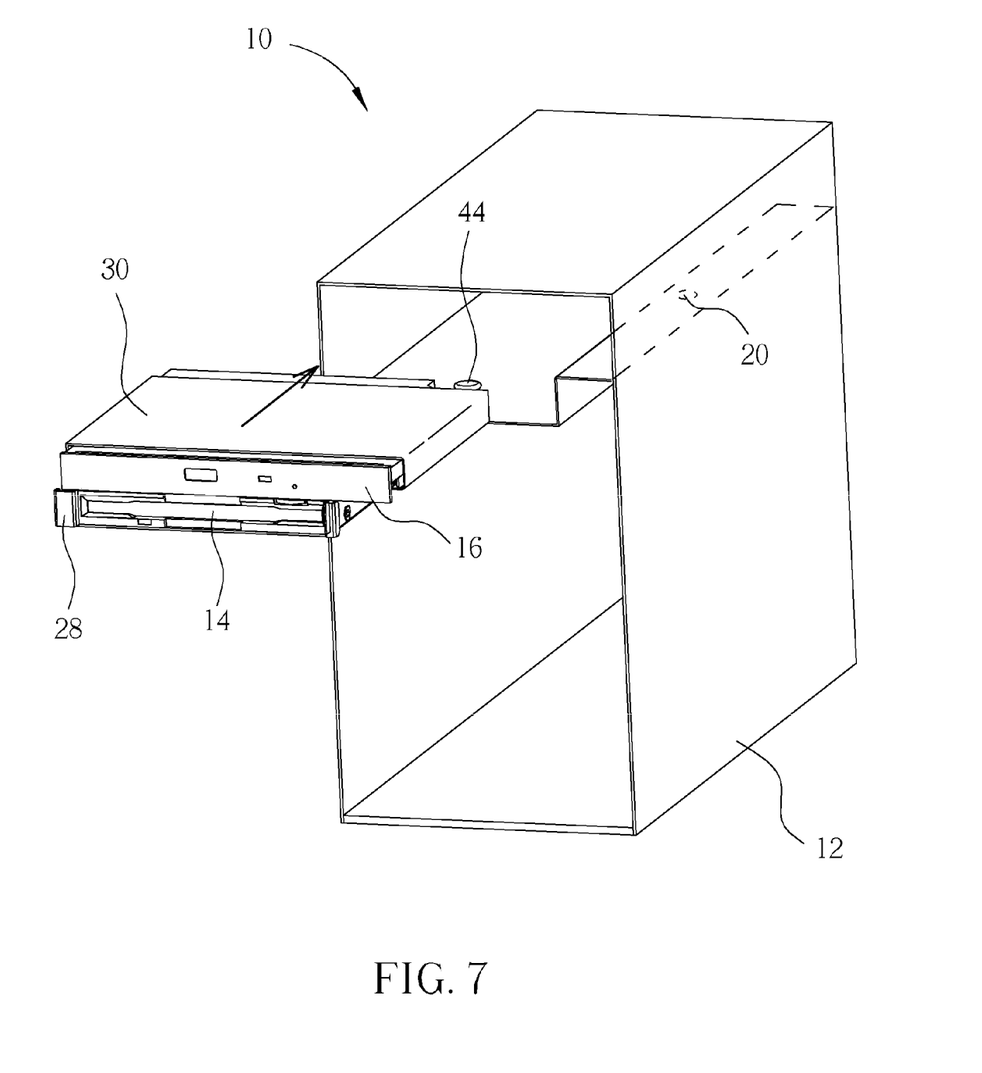
FIG. 7 is an assembly diagram of the holding module in FIG. 1.

More detailed description for assembly and disassembly of the holding module 10 is provided as follows. First, please refer to FIG. 1, FIG. 2, and FIG. 3. FIG. 3 is a diagram of disposing the first electronic device 14 in FIG. 1 in the case 28 of the fixing mechanism 18. When a user wants to dispose the first electronic device 14 in the first containing space 39 above the lower board 34, the user needs to laterally dispose the first electronic device 14 into the first containing space 39 cooperatively formed by the lower board 34, the first lateral board 36, and the second lateral board 38. At the same time, the user may also need to align the first fixing hole 22 of the first electronic device 14 with the protruding part 40 of the first lateral board 36. Thus, when the first electronic device 14 is disposed in the first containing space 39, the protruding part 40 of the first lateral board 36 also inserts into the first fixing hole 22 of the first electronic device 14 simultaneously so that the first electronic device 14 may be fixed on the lower board 34. Next, please refer to FIG. 1, FIG. 2, and FIG. 4. FIG. 4 is a diagram of disposing the first electronic device 14 and the second electronic device 16 in the case 28. After disposing the first electronic device 14 in the containing space 39 above the lower board 34, the user may continue to dispose the second electronic device 16 in the second containing space 47 above the first electronic device 14 and may push the second electronic device 16 to abut against the stopper 42 of the first lateral board 36 so that the second electronic device 16 may be positioned on the first electronic device 14. Next, please refer to FIG. 1, FIG. 2, and FIG. 5. FIG. 5 is a diagram of the fixing plate 32 fixing the first electronic device 14 and the second electronic device 16 to the case 28. After positioning the second electronic device 16 on the first electronic device 14, the user may insert the guiding part 58 of the fixing plate 32 into the guiding slot 46 of the second lateral board 38 so that the first inserting part 54 may be inserted into the second fixing hole 24 of the first electronic device 14 and the second inserting part 56 of the fixing plate 32 may be inserted into the third fixing hole 26 of the second electronic device 16 accordingly. In such a manner, the first electronic device 14, the second electronic device 16, and the case 28 may be assembled more firmly by axial force provided from the first inserting part 54 and the second inserting part 56 of the fixing plate 32. Next, please refer to FIG. 1, FIG. 6, and FIG. 7. FIG. 6 is a diagram of the flexible fixing lid 30 in FIG. 1 fixing the first electronic device 14 and the second electronic device 16 to the case 28. FIG. 7 is an assembly diagram of the holding module 10 in FIG. 1. As shown in FIG. 6, after the said assembly processes are performed sequentially, the user may utilize the first fastening part 50 to fasten the first lateral board 36 of the case 28 and the second fastening part 52 to fasten the second lateral board 38 of the case 28. In summary, not only may the fixing mechanism 18 utilize the first containing space 39 and the second containing space 47 to contain the first electronic device 14 and the second electronic device 16 respectively, but the fixing mechanism 18 may also fix the first electronic device 14 and the second electronic device 16 to the case 28 through the engagement of the protruding part 40 of the first lateral board 36 and the first fixing hole 22 of the first electronic device 14, the engagement of the first inserting part 54 of the fixing plate 32 and the second fixing hole 24 of the first electronic device 14, the engagement of the second inserting part 56 of the fixing plate 32 and the third fixing hole 26 of the second electronic device 16, and the engagement of the flexible fixing lid 30 and the case 28. Finally, as shown in FIG. 7, after completing the said assembly process of the first electronic device 14, the second electronic device 16, and the fixing mechanism 18, the user may simply keep pushing the fixing mechanism 18, in which the first electronic device 14 and the second electronic device 16 are disposed, into the frame 12 along a direction indicated by an arrow shown in FIG. 7 until the positioning rod 44 inserts into the positioning hole 20 of the frame 12, at which point the assembly process of the holding module 10 may be completed.

On the other hand, if the user wants to detach the fixing mechanism 18 with the first electronic device 14 and the second electronic device 16 from the frame 12, the user simply needs to pull the positioning rod 44 of the first lateral board 36 to leave the positioning hole 20 of the frame 12, and then pull the fixing mechanism 18 out of the frame 12 along a direction opposite to the arrow direction shown in FIG. 7. As a result, the fixing mechanism 18 may be detached from the frame 12. Subsequently, the user needs to exert force to pull the second fastening part 52 of the flexible fixing lid 30 away from the second lateral board 38 so as to release the engagement of the flexible fixing lid 30 and the case 28. After detaching the fixing plate 32 from the second lateral board 38, the user may take the second electronic device 16 and the first electronic device 14 from the case 28 sequentially, and then the disassembly process of the holding module 10 is completed.

It should be mentioned that number of the protruding part and the inserting part may be increased. For example, the number of the protruding part 40 on the first lateral board 36 and the first inserting part 54 and the second inserting part 56 on the fixing plate 32 may be increased by up to two, and the number of the first fixing hole 22, the second fixing hole 24, and the third fixing hole 26 may be increased correspondingly. In such a manner, the first electronic device 14 and the second electronic device 16 may be disposed in the fixing mechanism 18 more firmly. Furthermore, the structural designs of the flexible fixing lid 30 and the fixing plate 32 are also not limited to the said embodiment. That is to say, the fixing plate 32 may also be formed with the flexible fixing lid 30 integrally. For example, the first inserting part 54 and the second inserting part 56 may also be formed on the second fastening part 52 of the flexible fixing lid 30. Thus, when the second fastening part 52 fastens the second lateral board 38 of the case 28, the first inserting part 54 and the second inserting part 56 may also be inserted into the second hole 24 of the first electronic device 14 and the third fixing hole 26 of the second electronic device 16 respectively. In such a manner, the related assembly process may be further simplified and the related manufacturing cost may also be further reduced.

Compared with the prior art fixing an electronic device via screws, the holding module of the present invention utilizes the engagement of the inserting parts on the fixing plate and the protruding parts of the case with the fixing holes of the electronic devices and the fastening of the flexible fixing lid and the case to fix the electronic devices to the frame. Thus, not only may time needed for assembling an electronic device to a computer frame be reduced correspondingly, but the electronic device may be detached from the computer frame more conveniently.

Those skilled in the art will readily observe that numerous modifications and alterations of the device and method may be made while retaining the teachings of the invention.

What is claimed is:

1. A fixing mechanism for fixing electronic devices, the fixing mechanism comprising:
   a case comprising:
      a lower board, a first containing space formed on the lower board for containing a first electronic device;
      a first lateral board connected to a side of the lower board and having a protruding part, the protruding part used for insertion into a first fixing hole of the first electronic device when the first electronic device is disposed on the lower board; and
      a second lateral board connected to a side of the lower board opposite to the first lateral board; and
   a flexible fixing lid disposed on the case, a second containing space formed by the flexible fixing lid and the case cooperatively for containing a second electronic device on the first electronic device, the flexible fixing lid comprising:
      a base board;
      a first fastening part connected to an end of the base board for fastening the first lateral board; and
      a second fastening part connected to an end of the base board opposite to the first fastening part for fastening the second lateral board.

2. The fixing mechanism of claim 1 further comprising:
   a fixing plate disposed between the second fastening part and the second lateral board and having a first inserting part and a second inserting part, the first inserting part and the second inserting part used for respectively insertion into a second fixing hole of the first electronic device and a third fixing hole of the second electronic device when the second fastening part fixes the fixing plate on the second lateral board.

3. The fixing mechanism of claim 2, wherein both the first inserting part and the second inserting part are a pin.

4. The fixing mechanism of claim 2, wherein a guiding slot is formed on the second lateral board, the fixing plate has a guiding part corresponding to the guiding slot, and the guiding part is used for insertion into the guiding slot so as to position the fixing plate on the second lateral board.

5. The fixing mechanism of claim 2, wherein the fixing plate and the flexible fixing lid are formed integrally.

6. The fixing mechanism of claim 1, wherein the first lateral board has a stopper for positioning the second electronic device on the case.

7. The fixing mechanism of claim 1, wherein the protruding part is a pin.

8. The fixing mechanism of claim 1, wherein the first lateral board has a positioning rod for insertion into a positioning hole of a frame when the fixing mechanism is fixed to the frame.

9. A holding module for fixing electronic devices, the holding module comprising:
   a frame having a positioning hole;
   a first electronic device having a first fixing hole and a second fixing hole;
   a second electronic device; and
   a fixing mechanism for fixing the first electronic device and the second electronic device to the frame, the fixing mechanism comprising:
      a case comprising:
         a lower board, a first containing space formed on the lower board for containing the first electronic device;
         a first lateral board connected to a side of the lower board and having a protruding part, the protruding part used for insertion into the first fixing hole of the first electronic device when the first electronic device is disposed on the lower board; and
         a second lateral board connected to a side of the lower board opposite to the first lateral board; and
      a flexible fixing lid disposed on the case, a second containing space formed by the flexible fixing lid and the case cooperatively for containing the second electronic device on the first electronic device, the flexible fixing lid comprising:
         a base board;
         a first fastening part connected to an end of the base board for fastening the first lateral board; and
         a second fastening part connected to an end of the base board opposite to the first fastening part for fastening the second lateral board.

10. The holding module of claim 9 further comprising:
    a fixing plate disposed between the second fastening part and the second lateral board and having a first inserting part and a second inserting part, the first inserting part and the second inserting part used for respectively insertion into the second fixing hole of the first electronic device and a third fixing hole of the second electronic device when the second fastening part fixes the fixing plate on the second lateral board.

11. The holding module of claim 10, wherein both the first inserting part and the second inserting part are a pin.

12. The holding module of claim 10, wherein a guiding slot is formed on the second lateral board, the fixing plate has a guiding part corresponding to the guiding slot, and the guiding part is used for insertion into the guiding slot so as to position the fixing plate on the second lateral board.

13. The holding module of claim 10, wherein the fixing plate and the flexible fixing lid are formed integrally.

14. The holding module of claim 9, wherein the first lateral board has a stopper for positioning the second electronic device on the case.

15. The holding module of claim 9, wherein the protruding part is a pin.

16. The holding module of claim 9, wherein the first lateral board has a positioning rod for insertion into the positioning hole of the frame when the fixing mechanism is fixed to the frame.

17. The holding module of claim 9, wherein the first electronic device is a card reader or a floppy disk drive.

18. The holding module of claim 9, wherein the second electronic device is an optical disk drive or a hard disk drive.

* * * * *